United States Patent [19]

Buro

[11] 3,999,189
[45] Dec. 21, 1976

[54] GRAPHIC RECORDING DEVICE

[75] Inventor: Paul Buro, Hamburg, Germany

[73] Assignee: U.S. Philips Corporation, New York, N.Y.

[22] Filed: July 28, 1975

[21] Appl. No.: 599,673

[30] Foreign Application Priority Data

Aug. 2, 1974 Germany ............................ 2437196

[52] U.S. Cl. ............................................ 346/139 C
[51] Int. Cl.² ........................................ G01D 15/06
[58] Field of Search ................... 346/139 C; 197/36

[56] References Cited

UNITED STATES PATENTS

| 2,719,775 | 10/1955 | Erving, Jr. | 346/139 C |
| 2,916,343 | 12/1959 | Alden | 346/139 C |
| 3,317,917 | 5/1967 | Little, Jr. et al. | 346/139 C |
| 3,419,886 | 12/1968 | Ortlieb | 346/139 C X |
| 3,429,991 | 2/1969 | Ortlieb | 346/74 X |
| 3,713,168 | 1/1973 | Baker | 346/74 E |

Primary Examiner—George H. Miller, Jr.
Attorney, Agent, or Firm—Frank R. Trifari; David R. Treacy

[57] ABSTRACT

A device for graphic recording, using a plurality of stacked electrode blocks. The electrode tip projects from the block obliquely with respect to the transport direction of the paper. Each block has an internal opening communicating with the others, so that one channel which extends through the entire stack of blocks is produced. Compressed air can be blown through this opening to scavenge paper particles.

1 Claim, 2 Drawing Figures

GRAPHIC RECORDING DEVICE

BACKGROUND OF THE INVENTION

1. Field of the Invention

The invention relates to a device for graphic recording on electrosensitive paper, comprising a recording head consisting of a plurality of stacked electrode blocks wherein electrode wires are provided which are bent such that the end of the wire which serves as the electrode can freely move.

In known recording heads of this type it is difficult to keep the write pins, adjacently arranged perpendicular to the transport direction of the paper, as small as possible and to minimize their spacing. The printed alpha-numerical characters, consequently, do not give the impression of an uninterrupted line. Moreover, the electrodes should be very regular and should always contact the paper in the same manner.

2. Description of the Prior Art

In order to achieve this object, a device has been proposed in which the electrode wires within each electrode block are bent such that the actual outwards projecting electrode pin can freely move about a pivot inside the block. As a result, the electrode can be deflected by any movement of the paper in the transport direction of the paper as well as in the direction perpendicular thereto. However, it is a drawback that the electrode pins, due to their perpendicular position with respect to the paper, scratch the paper, start to vibrate and hence produce uncontrollable prints. The unavoidable paper scrapings then occurring cause contamination of the pins and the hollow space of the electrode block wherein the pin is journalled. The vibrations, moreover, reduce the recording speed and cause a less legible print image.

SUMMARY OF THE INVENTION

The object of the invention is to improve the printing device such that vibrations of the electrode pin and contamination of the device by paper scrapings are prevented.

According to the invention the end of each electrode wire which projects from each electrode block and which serves as an electrode is bent obliquely in the direction perpendicular to the stacking direction, and each electrode block comprises at least one opening such that an opening is formed which extends through the entire stack of blocks.

The invention will be described in detail hereinafter with reference to the accompanying drawing.

DESCRIPTION OF THE PREFERRED EMBODIMENTS

Figure 1:
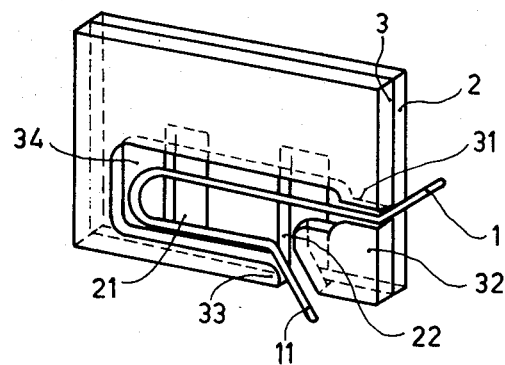
FIG. 1 is a perspective view of an electrode block.
Figure 2:
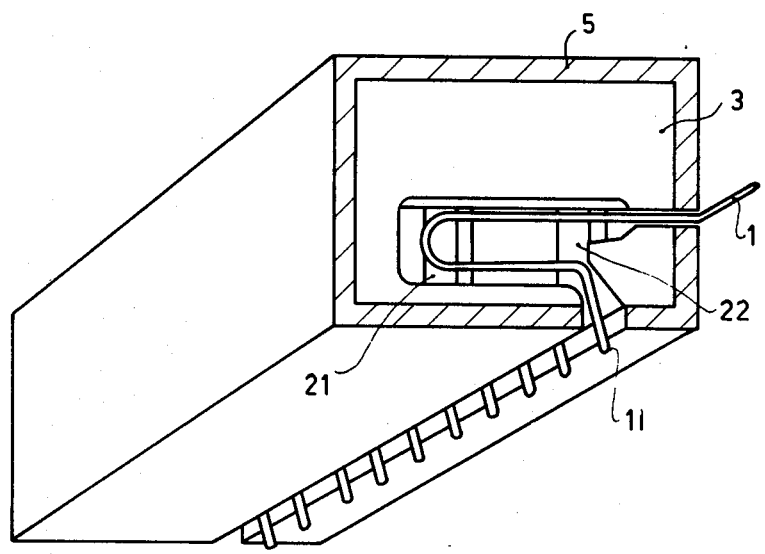
FIG. 2 is a perspective cross-sectional view of the device according to the invention.

FIG. 1 shows an electrode block of a recording head for graphic recording on electrosensitive paper; several of these blocks are adjacently arranged in a housing 5 (FIG. 2). The individual electrode tips 11 project obliquely from a slot on the lower side of this housing. These electrode tips slide in a known manner (not shown) over a piece of electrosensitive paper which is transported in the direction of the arrow $f$.

Each electrode block consists of two slabs 2 and 3 which have the same external dimensions. The slab 2 serves for spacing, and the slab 3 serves for retaining the electrode wire 1. The slab 3 is provided with a recess 34 in which the U-shaped bent portion of the electrode wire 1 is journalled to be freely movable. The electrode wire 1 itself is clamped between the projections 31 and 32 of the slab 3, its front end 11 bearing on the projection 33. This front end 11 serves as an electrode pin, and the tip thereof slides over the electrosensitive paper. An image is formed on the paper in known manner by the application of a voltage to the electrode wire 1.

Because the sliding of the electrode tip 11 over the paper cannot entirely prevent the formation of paper scrapings, two openings 21 and 22 are provided in the slab 2 which are situated at the area of the recess 34 of the slab 3. In the case of adjacently stacked electrode blocks, two channels which extend through the entire recording head are thus formed; through these channels air can be forced from time to time, so that the scraped off particles can be removed from the recording head by the air flow. Instead of the two openings, it is alternatively possible for only one opening to be present, the said opening then preferably being situated at the area of the opening 22.

What is claimed is:

1. A device for graphic recording on electrosensitive paper, comprising a recording head comprising a plurality of stacked electrode blocks each having an electrode wire mounted in a recess therein, said wires being bent such that an end of each wire serves as the electrode and is freely movable, wherein said end of the electrode wire projects from the corresponding electrode block obliquely in the direction perpendicular to the stacking direction, each of the electrode blocks comprising at least one opening communicating with said recess, said opening communicating with each other so as to form an interior channel extending through said stacked plurality of blocks adapted for forced air flow to scavenge particles from the recording head.

* * * * *